March 12, 1968     L. BIRCH     3,372,493
ANTIQUED PAINTING ON WOOD AND BY-THE-NUMBER
SYSTEM OF MAKING THE SAME Filed Sept. 15, 1967     2 Sheets-Sheet 1

INVENTOR.
LAWRENCE BIRCH
BY
ATTORNEYS

March 12, 1968 L. BIRCH 3,372,493
ANTIQUED PAINTING ON WOOD AND BY-THE-NUMBER
SYSTEM OF MAKING THE SAME
Filed Sept. 15, 1967 2 Sheets-Sheet 2
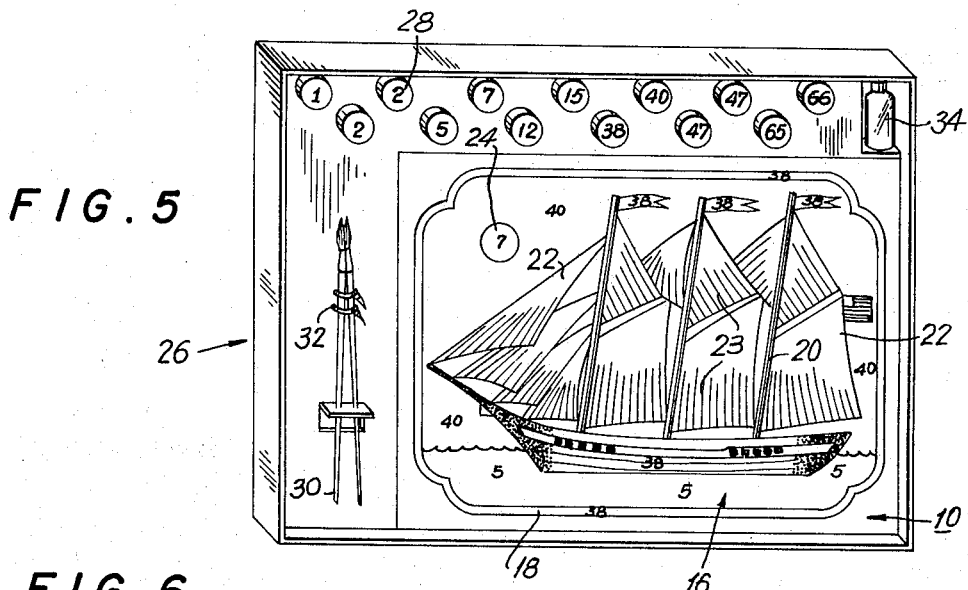
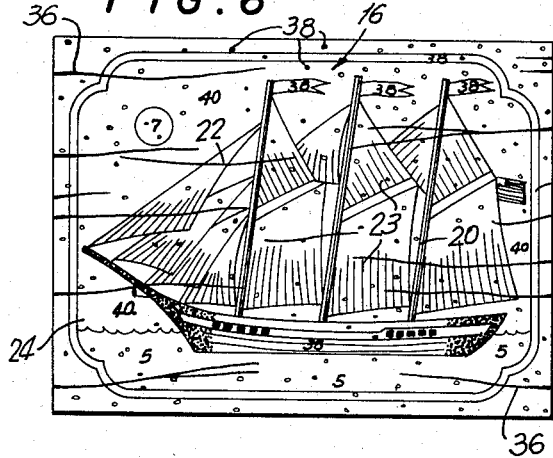
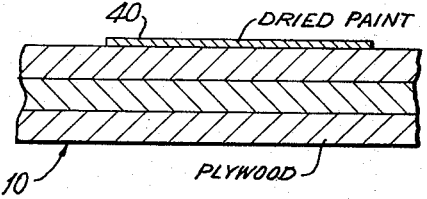
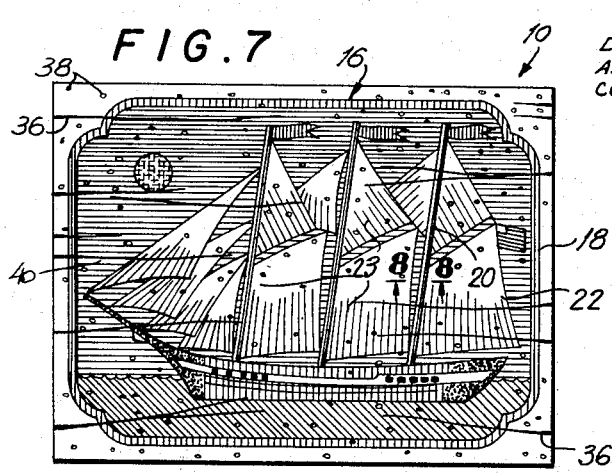
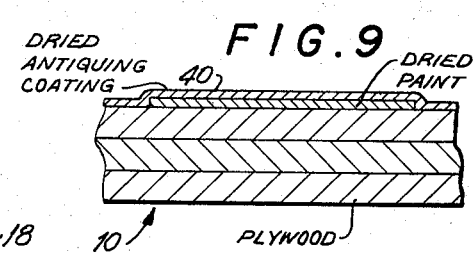
INVENTOR.
LAWRENCE BIRCH
BY
ATTORNEYS United States Patent Office 3,372,493
Patented Mar. 12, 1968

3,372,493
ANTIQUED PAINTING ON WOOD AND BY-THE-NUMBER SYSTEM OF MAKING THE SAME
Lawrence Birch, Rego Park, N.Y., assignor to Avalon Manufacturing Corporation, Brooklyn, N.Y., a corporation of New York
Filed Sept. 15, 1967, Ser. No. 667,933
7 Claims. (Cl. 35—26)

ABSTRACT OF THE DISCLOSURE

A system of making an antique painting by smoothing a broad face of a wood panel, applying an impermeable clear sizing coat to said face, forming a paint-by-number design with a dark oleophobic material on the face, supplying the panel to a user along with matched number-identified oil paints and a transparent tinted antiquing lacquer, scoring and punching the face of the panel according to artistic taste to simulate an old piece of wood with cracks and wormholes, filling in the paint-by-number areas with the oil paints while leaving unpainted the paint-by-number lines that form the design, allowing the paints to dry, and finally applying the antiquing lacquer over the painted face of the panel.

BACKGROUND OF THE INVENTION

1. Field of the invention

A by-the-number painting and method of and kit for making the same.

2. Description of the prior art

Paint-by-the-number kits are in widespread commercial use. Conventionally, such a kit constitutes a cardboard or paperboard panel on which a paint-by-the-number design has been applied. The kit further includes a set of vials containing different color paints which are identified by numbers that correspond to numbers supplied on the paint-by-number design. The user fills in each of the areas with the correspondingly numbered paint. The design is so arranged that the user is supposed to have the applied paints in different adjacent areas touch one another. In an effort to simulate realism, the better paint-by-the-number kits have at certain portions many tiny areas wherein designated paints varying from one another only by small changes in hue are applied. However, no matter how small these areas are, the final effect is never truly realistic and in the less expensive kits with larger areas making up the design the finished result is obviously the work of an amateur. Inasmuch as the paintings are reproductions of works of art of realistic types, the crudeness of a finished painting is immediately appearent and is a cause of dissatisfaction to the hobbyist. It further should be mentioned that it also has been proposed to supply paint-by-the-number kits wherein the panel is made of velvet, but this too is subject to the same drawback, to wit, that the finished painting is too crude to satisfy the aesthetic yearnings of the amateur painter.

SUMMARY OF THE INVENTION

The present invention avoids the foregoing drawback and actually takes advantage of the crude appearance of a finished by-the-number painting by using a wood panel and by providing a paint-by-the-number design of a type which is appropriate to a wood painting, that is to say, to a true antique painting which has been painted on wood instead of on canvas. One school of painting of this type is "Early American." Authentic paintings of such nature painted on wood have attendant outward physical characteristics which appear in the wood upon aging, such, for instance, as cracks and worm holes. Paintings of this nature are usually somewhat crude. By creating a system wherein the finished painting is on a wood panel with lines and perforations therein, and wherein the painting itself is expected to be of a somewhat crude nature, the finished by-the-number painting has an authentic aura of antiquity and realism, whereby the user feels that the finished result truly resembles an antique work of art.

Accordingly, it is an object of the present invention to provide a system for making an antique by-the-number wood painting.

It is another object of the invention to provide a system of the character described in which the painting is on a panel which is provided with scores and punctures and in which the colored areas are separated by a line background of a single dark color, like a lattice, which permeates the area of the finished painting.

It is another object of the invention to provide a kit and system which will enable an inexperienced user to create a picture having a desired aspect of realism and age.

It is another object of the invention to provide a system of the character described in which the desired result is achieved at low cost and in an attractive manner.

Other objects of the invention in part will be obvious and in part will be pointed out hereinafter.

The invention accordingly consists in the features of construction, combinations of elements, arrangements of parts and series of steps which will be exemplified in the method, kit and painting hereinafter described and of which the scope of application will be indicated in the appended claims.

BRIEF DESCRIPTION OF THE DRAWINGS

In the accompanying drawings in which is shown one of the various possible embodiments of the invention.

FIG. 5 is a perspective view of the kit for carrying out the present invention, the cover being removed;

FIG. 6 is a top plan view of the panel after the same has been scored and punctured by the user;

FIG. 7 is a view similar to FIG. 6 of the panel after by-the-number paints have been applied thereto.

FIG. 8 is a fragmentary enlarged sectional view through the panel of FIG. 7; and FIG. 9 is a view similar to FIG. 8, but showing a later state in the preparation of the painting wherein the antiquing solution has been applied.

DESCRIPTION OF THE PREFERRED EMBODIMENT

Pursuant to the present invention a panel 10 of wood is provided. The panel may be of any desired plan configuration which resembles the plan configuration of true antique paintings. Conventionally, the panel will be rectangular and preferably oblong. However, this is not meant to preclude the use of other shapes, such as oval and circular, or more esoteric configurations if the same should be desired. By way of illustration, in one kit embodying the present invention the panel is 12" x 16".

Although it is within the scope of the invention to employ a solid wood panel, that is to say, a wood panel made up of a single piece of wood (solid through and through), it is preferred to fabricate the panel 10 from plywood, inasmuch as this has a better planar stability under the changing moisture conditions encountered in a dwelling. Preferably, there is employed a ¼″ fir plywood since this is the type widely available at a low cost.

As obtained from the mill a piece of plywood has one finished side and one unfinished side. However, if desired, plywood may be employed having two rough sides. In either event, the side, i.e., face, on which the painting is to be made is treated to provide a very fine finish thereto. Usually, even a finished face of a piece of plywood will have some blemishes 12 therein. These may be in the form of knotholes, depressions, scores, splintered out grooves, etc. which, for a purpose that later will be appreciated, should be removed in accordance with the present invention. Such blemishes are in fact removed by a well known process which consists in cutting out a portion of the top ply, usually in the form of an ellipse having pointed ends, and inserting in such cut-out portion a closely matching ply float 13 of the same wood, to wit, fir, of the same thickness. This inserted float is laminated in place, as by the use of an adhesive, being held under pressure until the adhesive is set, so that the finished surface now constitutes an uninterrupted planar surface, i.e., a surface free of blemishes.

Figure 1:
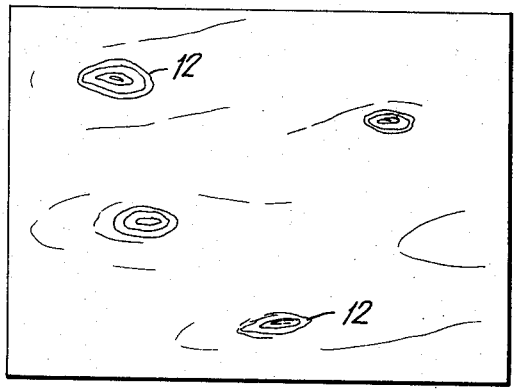
FIG. 1 is a top plan view of a plywood panel in its original mill condition.
Figure 2:
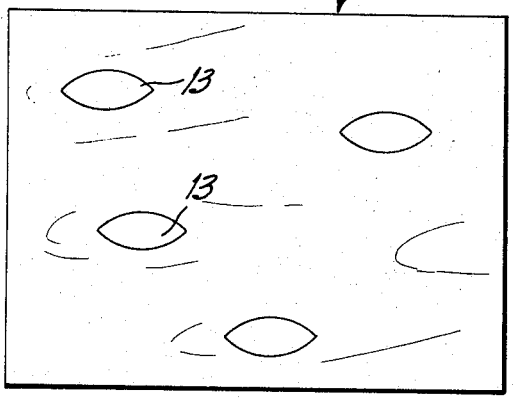
FIG. 2 is a similar view of the same panel after the side to be painted has been finished and smoothed and is ready for the application of a sizing coat.

Thereafter, the face to be painted is further treated to finely finish the same. This is done by sanding the face with a conventional sander with a very fine finish grit, e.g., about 000, so that no scratch visible to the naked eye remain, and the surface is flat and continuous. The surface is next vacuumed to remove particulate wood created during sanding. Finally, the surface is buffed by passing the same over the periphery of a high speed rotary cloth buffing wheel. This removes any residual traces of particulate wood and also somewhat hardens and polishes the surface, so that it is in better condition to receive paint and to permit a user's brush to apply paint to designated limited areas thereof without interfering with the smooth travel of the brush. At this time the panel 10 has the appearance shown in FIG. 2.

Figure 3:
FIG. 3 is a similar view of the same panel after the sizing coat has been applied.

The next step is to apply to the smooth face of the panel 10 an impermeable clear sizing coat 14. The sizing coat may be a varnish, a shellac or lacquer. Preferably, varnish is employed, the same being thin enough, as is well known in the art, to enter into and seal the face of the fir plywood. This sizing coat will subsequently prevent later applied paint from being absorbed by the porous fir plywood, whereby the paint can dry as a coherent coating rather than being drawn into the wood to leave a rough finish. It also will prevent the subsequently applied paint from tending to run together beneath the surface of the wood, and finally, it will prevent the subsequently applied paint from raising fiber on the wood. The sizing coat may slightly raise the fibers of the wood and if so, the treated face of the wood panel may be further smoothed by sanding and vacuuming. However, the wood fibers do not have a strong tendency to raise, inasmuch as they have been pressed down by the previously mentioned and previously effected buffing operation. The panel at this time has the appearance shown in FIG. 3.

Next, a design is prepared. This is a by-the-number design, that is to say, it is a design made up of a large number of adjacent areas separated by a lattice, i.e., a skeleton. Each of the areas to be painted is identified by a contained number which designates a matching paint subsequently to be applied to that area.

The design, as noted earlier, is characterized by the fact that it is representative of a type (school) of painting which is cruder than realistic paintings of the old masters. Such a design is that, for instance, of the "Old American" type, or "Old English" or "English Pub" type. Furthermore, the designs of the present invention are characterized by the roughness of their art work and the fact that adjacent colored areas are separated by bands, which is to say, lines, of discernible width, all of the bands being of the same dark color, for instance, black or dark brown.

Moreover, the types of paintings used in the instant invention often are associated in the public mind with paintings which artists originally made on wood. Hence, the fact that in the present invention paintings of this type are employed for reproduction by the novice on wood reinforces the authenticity of the painting after it is made. Because it is on wood and because it is inherently crude it looks all the more like an authentic painting. The design 16 is applied to the finished smooth sized face of the panel 10.

Figure 4:
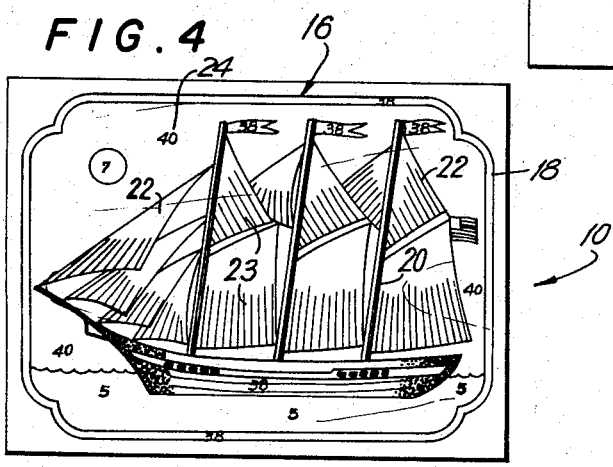
FIG. 4 is a similar view of the same panel after the paint-by-the-number skeleton design has been applied.

In FIG. 4 a very simple design has been shown of a whaling schooner. The design includes a perimetrical frame 18 within which a lattice 20 of interconnected lines forms areas 22 which are to have different colored paints applied thereto. It will be understood that not all of the areas need be painted, inasmuch as in some instances, for example, the sails of the illustrated design, the natural wood grain may be allowed to show through. Moreover, some of the lines, as for instance, the short vertical lines 23 within the sail, need not define areas, but simply are part of the finished painting. The lattice lines circumscribing the areas 22 are broader than required merely to define the areas. Typically, such lines will be from ⅟₁₆ to ¼ of an inch in breadth. The lines which do not define areas but simply a part of the design may be of the same breadth or thinner, e.g., as thin as ⅟₃₂ of an inch.

The design is applied to the sized surface 14 of the panel 10 by any well known technique. Thus, if large quantities of single designs are to be made, they can be made with a printing plate. However, in the preferred form of the invention, the design is applied by silk screening, i.e., by forcing the paint through portions of a screen the remainder of which has been covered by an impermeable coating. Silk screening has the advantage that it is less expensive to employ where less than a large number of designs are to be imprinted, for instance, where only a few thousand of each of different designs are to be made. Moreover, silk screening has the further advantage that the lines made with it are not sharp edged, but rather are slightly irregular which further enhances the authenticity of the finished painting and blends in with the crudeness of painting applied by a tyro.

Each of the areas 22 has contained within it a number 24, different numbers being applied to different areas and each number designating the color of paint to be applied by the user in such area. The colors are selected by the designer so as to create a picture which will truly resemble an authentic work of the art employed, such as "Early American." The design itself is somewhat crude, that is to say, bold in its presentation of the object painted, or of the person painted, in other words, as is characteristic of this genre of art, it does not include fine detail. Moreover it does not follow the laws of perspective. People, if they are shown, are illustrated in stiff poses. The subjects correspond to the era, i.e., the objects illustrated are objects of a time long gone. The scenes do not illustrate modern objects, but are more typical of colonial life or old English life.

A special ink is used for forming the design 16. Specifically, there is utilized an oleophobic ink which is an ink that repels oil paints. This type of ink tends to prevent the colors of paint in adjacent areas from running into one another and thereby to leave the dark lines of the design 16 visible as bands of a single color in the finished painting. This, in effect, enhances the crudeness of the finished painting that is characteristic of the type of art which is employed in the present invention and which is associated with paintings on wood. Barrier inks which can be used to form the design are well known to the art. A typical ink is an acrylic lacquer. Another one is a lead-based ink.

The panel 10 with the design imprinted thereon is now assembled with other elements to form a kit 26 as illustrated in FIG. 5. Typically, the kit includes, in addition to the design carrying panel 10, a series of vials 28. Each vial includes a container with a cap. The different vials contain different colors, although if a large amount of one color is to be employed, more than one vial may contain the same color. Each cap has a number imprinted on the top which identifies the color in the vial and which corresponds to a number 24 identifying a design area. The kit further includes a paintbrush 30, a hanger 32 and a bottle 34 containing an antiquing solution.

The paints in the vials 28 are conventional oil paints. The antiquing solution is a clear paint which has been tinted. For example, the antiquing solution may be varnish to which has been added black and burnt sienna, or it may be clear mineral spirits mixed with black pigment and burnt sienna oil paste. The amounts of color present in the antiquing solution are sufficient to darken a dry film left after applying the solution as a coating, but not enough to appreciably conceal details of a painting beneath the dry coating. The amounts of darkening material included depends upon the type of subject which is to be painted, i.e., on the specific design.

The kit is sold to the public with suitable instructions. The purchaser is directed to distress the finished face of the panel 10, to apply the paints according to the numbers, and to apply the antiquing solution in a manner now to be described.

The first step practiced by the purchaser is to achieve the effect of a wood panel that has been seasoned by time. This is a "distressed" effect which the hobbyist obtains by making grooves 36 across the finished face of the panel carrying the design. The grooves can be made in any direction. For instance, they can be made horizontally or vertically. Preferably, they will in the main follow the general direction of the grain of the wood which is selected to be either horizontal or vertical. Also, to obtain an effect of checking, grooves can be made which intersect one another at right angles. The grooves 36 are made with a sharp pointed instrument, optimally with the corner of a chisel or gouge. However, as a practical matter, since the painting usually will be made by a novice or child who should not be allowed to handle such very sharp instruments. In the preferred form of the invention the instrument employed is a screwdriver, a corner of the edge of the screwdriver being gouged across the wood where the groove is to be made. Best effects are obtained where the grooves are made at closer intervals and deeper on the edge areas of the panel, for instance, beyond the perimetrical frame 18 if such is provided, or generally in the peripheral zone where no such frame is employed. The grooves 36 should not be drawn with regularity, that is to say, they should neither be straight nor of uniform depth, nor should they run directly across any dimension of the panel. Desirably, the grooves waver somewhat, since they are intended to represent the forming of cracks in the panel which are caused by age. Such cracks in a really old panel represent lines of cleavage along natural grains, not usually being straight or continuous or of uniform width or depth. Moreover, the spacing between the cracks should not be regular so as to more truly represent a natural antique effect.

Additionally, the panel is provided with punctures 38. These are formed with a pointed nail and a hammer in a number of places. They will produce the effect of worm holes. As in the case of the grooves, the simulated worm holes should be made in a greater abundance near the edges of the panel with relatively fewer toward the center to obtain a naturalistic effect.

It will be appreciated that the grooves 36 and punctures 38 can be applied by the manufacturer to the panel before application of the sizing, or before application of the design, or even after application of the design, in all such instances before being placed on the market. However, although this may be desirable for various technical reasons, such as not disturbing the sizing coat or not disturbing the lines which make up the design, or being provided in a predetermined highly artistic manner, none of these modes are used in the preferred form of the invention where it is left to the user, i.e., the hobbyist, to make the grooves and punctures himself, inasmuch as this secures a maximum degree of freedom of expression and individual character to the various paintings that will be made, so that no two paintings made in accordance with the invention will look exactly like one another.

Now the user proceeds to apply the oil paints from the vials 28. He will apply the paints, each identified by its number, to the correspondingly numbered areas of the design. These numbers not only appear on the panel in places where they will be covered up by the paints which are opaque, but the numbers also may be applied to an instruction sheet which carries the same design imprinted on paper with the same numbers so that the user can refer to this in case of doubt.

The oil paints, as is usual, contain driers, e.g., naphthanates, and after a period of time, usually a few days, the applied paints will be completely dry. Mention should be made of the fact that particularly good results are secured where the paints are applied with the brushes in such a fashion that they are not laid down evenly, as one would wish, for instance, in painting a piece of furniture or a wall. Rather, the paints are laid down desirably some what thickly, so that when dry the paint is not flat, but ridged, to show brush strokes. This, of course, not only enhances the crudeness of the finished painting, but it is in keeping with the schools of art employed in paintings of the present invention.

After the painted areas 40 are dry, the antiquing solution is applied over the entire face of the painted panel. The antiquing solution can be applied with a brush, a cloth or a sponge, and to obtain best effects is applied over the entire painted surface, allowed to stand for a few seconds, e.g., 10 seconds, and the excess then is blotted up with a soft cloth. In the preferred form of the invention more of the solution is withdrawn from the center area, thus leaving the edges darker. It is not necessary or even desirable to secure an even effect. A certain amount of spottiness will add to the authentic appearance of the finished painting. The antiquing solution is allowed to dry for a few minutes, it being a rather rapid drier where a mineral spirits type of solution is used, and then the antiquing step can be repeated to make a darker and even more uneven finish if the same should be desired.

The antiquing solution also should be applied to all edges of the panel to minimize absorption of moisture.

Finally, the hanger 32 is secured to the panel and the painting is now ready to be displayed.

It thus will be seen that there is provided a system and article which achieve the several objects of the invention, and which are well adapted to meet the conditions of practical use.

As various possible embodiments might be made of the above invention, and as various changes might be made in the embodiment above set forth, it is to be understood that all matter herein described or shown in the accompanying drawings is to be interpreted as illustrative and not in a limiting sense.

Having thus described the invention, there is claimed as new and desired to be secured by Letters Patent:

1. A by-the-number kit for preparing an antiqued painting, said kit comprising a soft, distressable plywood panel having one broad, flat, smooth, sanded, buffed surface with a sizing coat thereon and over the sizing coat a crude, by-the-number-design of a dark oleophobic ink of a type belonging to a school of art such as Early American, Old English and English Pub, said design including a multiplicity of numbered areas at least some of which are to be painted in sundry colors, a plurality of vials containing oil paints, different vials being identified by different numbers corresponding to matching numbers of the areas of the design, and a clear dark antiquing means.

2. A by-the-number method of making an antiqued painting on wood, said method comprises providing a plywood panel of soft, distressable wood, sanding and buffing one face of the panel to provide a flat smooth surface, applying a sizing coating to said surface, applying to the sized surface with a dark oleophobic ink a crude by-the-number design of a type belonging to a school of art such as Early American, Old English, and English Pub, said design including a multiplicity of numbered areas at least some of which are to be painted in sundry colors, then distressing said surface of the panel, then painting different areas with different colors of oil paints, while leaving the dark ink of the design unpainted, then allowing the applied oil paints to dry, and finally applying over the painted surface a clear dark antiquing solution.

3. A method as set forth in claim 2 wherein the distressing is effected by drawing a pointed object irregularly and at random over different portions of the panel to leave irregular, irregularly spaced grooves therein.

4. A method as set forth in claim 2 wherein the distressing is effected by randomly puncturing the wood with a pointed instrument to simulate worm holes.

5. A method as set forth in claim 2 wherein the distressing is performed more heavily near the perimeter than near the center of the panel.

6. An antiqued by-the-number painting on wood made by the method of claim 2.

7. An antiqued by-the-number painting on wood comprising a wood panel one face of which has been sanded and buffed to leave the same flat and smooth, then sized and then applied thereto with a dark oleophobic ink a crude by-the-number design of a type belonging to a school of art such as Early American, Old English and English Pub, said panel having the face thereof distressed and having the design colored by painting with the ink left exposed, said painted design having an overlay of an antiquing coating.

References Cited
UNITED STATES PATENTS

| | | | |
|---|---|---|---|
| 390,611 | 10/1888 | McHugh | 117—8 |
| 2,371,153 | 3/1945 | Connelly | 35—26 |
| 2,744,349 | 5/1956 | Grossman | 35—26 |

EUGENE R. CAPOZIO, *Primary Examiner.*

H. S. SKOGQUIST, *Assistant Examiner.*